Figure 1:
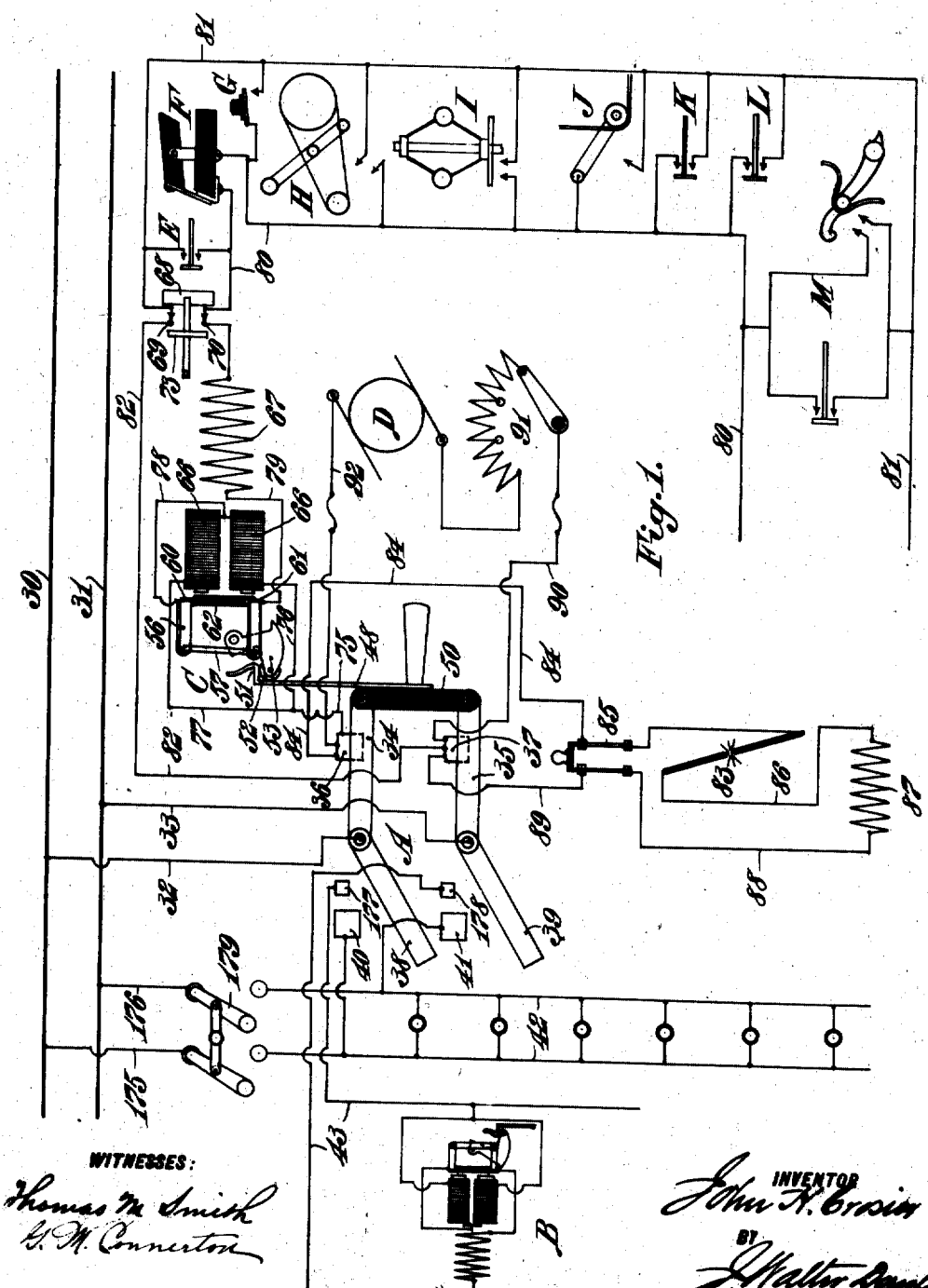

J. H. CROSIER.
SAFETY APPARATUS FOR AMUSEMENT OR OTHER AUDITORIUMS.
APPLICATION FILED MAR. 19, 1909. RENEWED NOV. 18, 1910.

1,000,154.

Patented Aug. 8, 1911.
5 SHEETS—SHEET 1.

J. H. CROSIER.
SAFETY APPARATUS FOR AMUSEMENT OR OTHER AUDITORIUMS.
APPLICATION FILED MAR. 19, 1909. RENEWED NOV. 18, 1910.
1,000,154.
Patented Aug. 8, 1911.
5 SHEETS—SHEET 2.
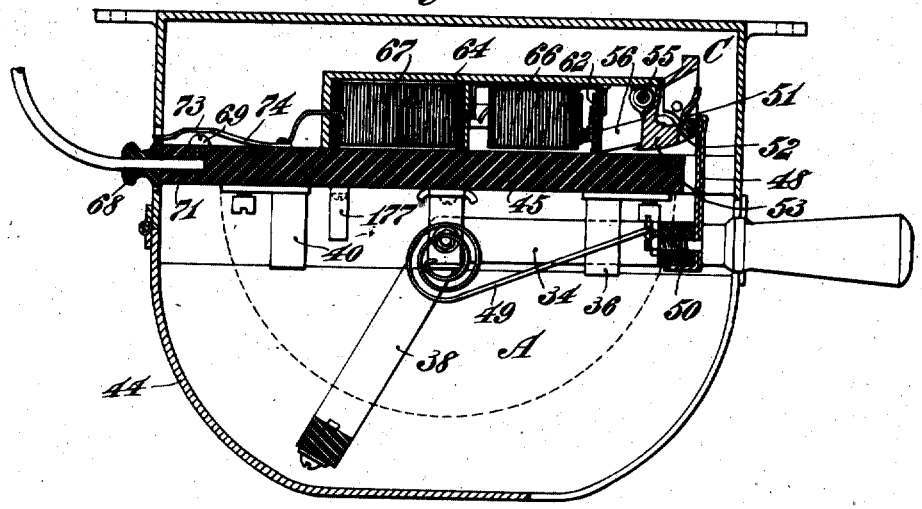
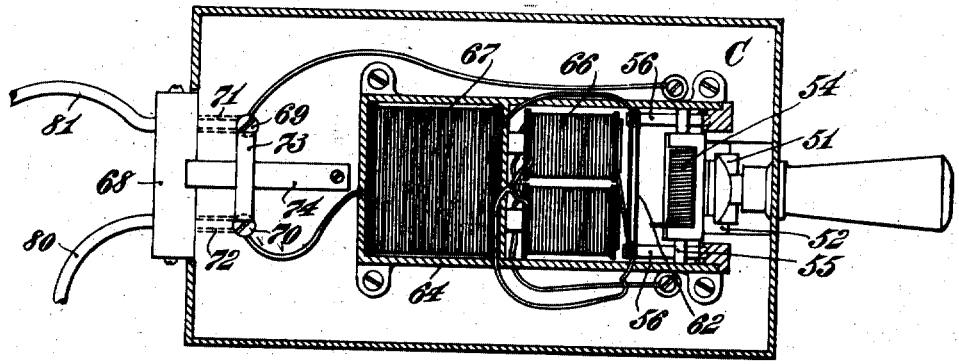
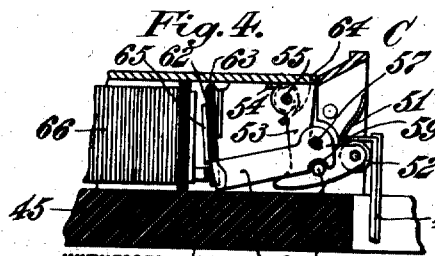
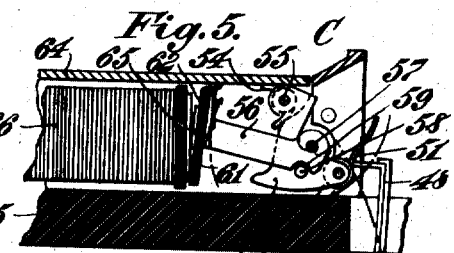

J. H. CROSIER.
SAFETY APPARATUS FOR AMUSEMENT OR OTHER AUDITORIUMS.
APPLICATION FILED MAR. 19, 1909. RENEWED NOV. 18, 1910.
1,000,154.
Patented Aug. 8, 1911.
5 SHEETS—SHEET 3.
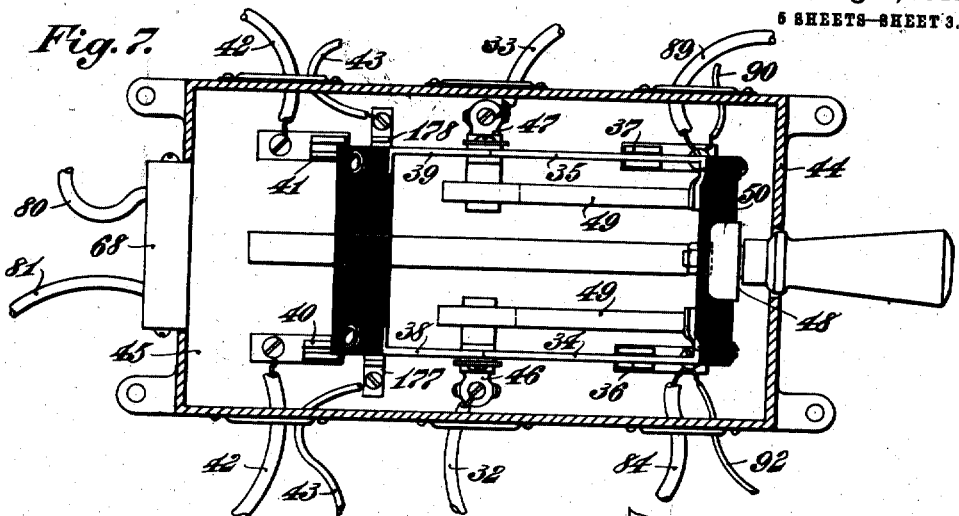
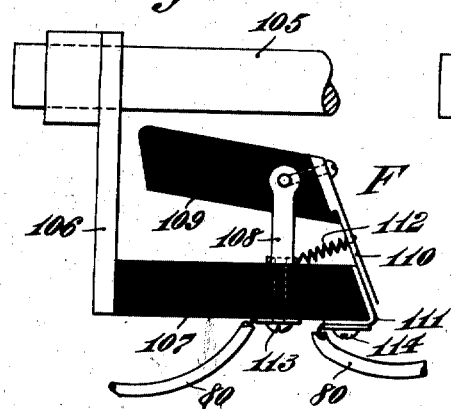
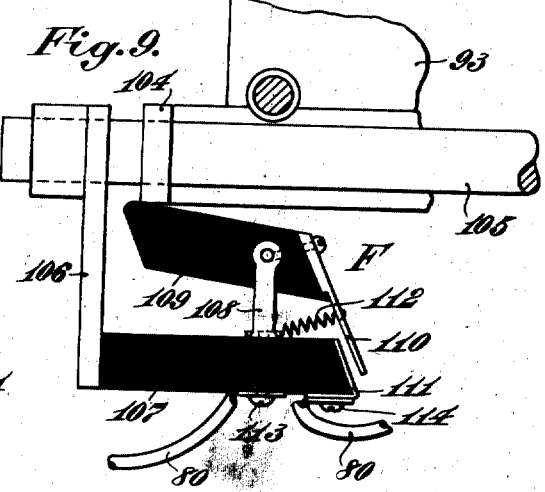
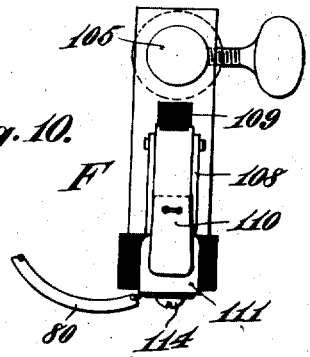

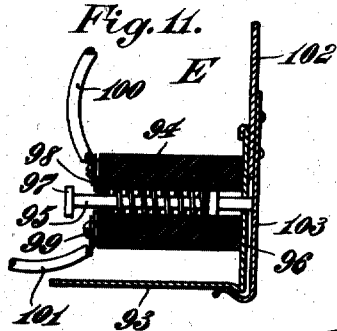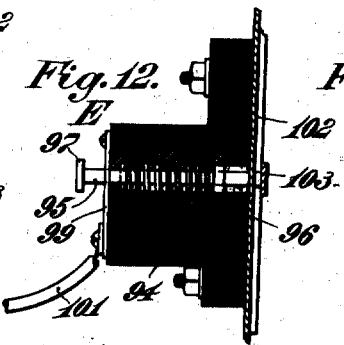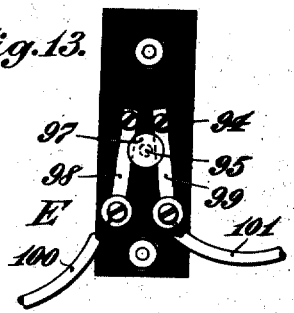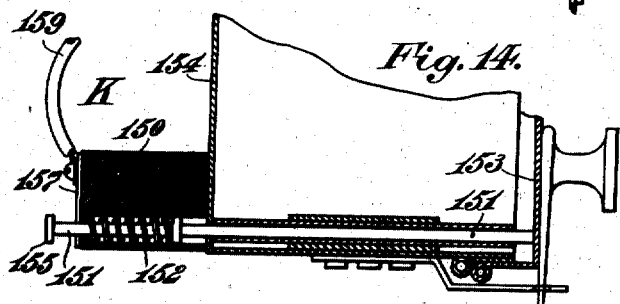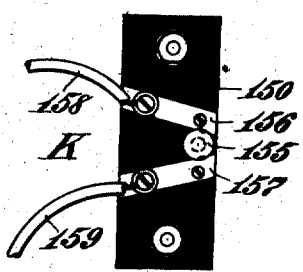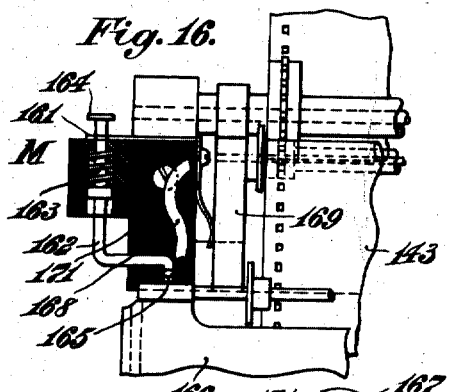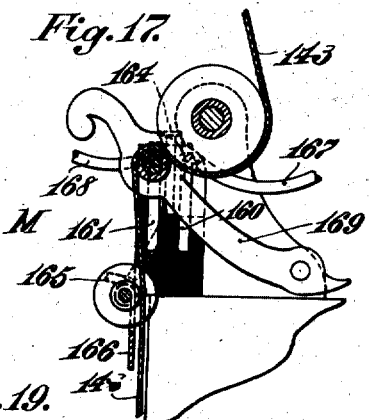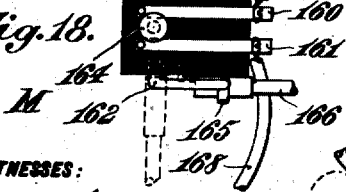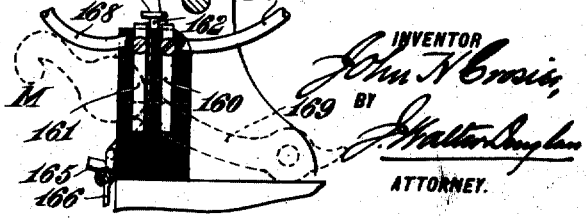

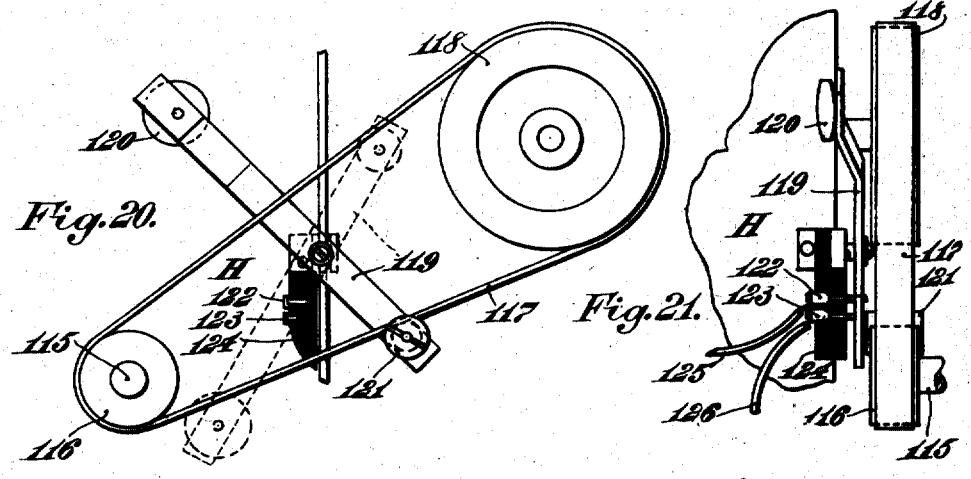
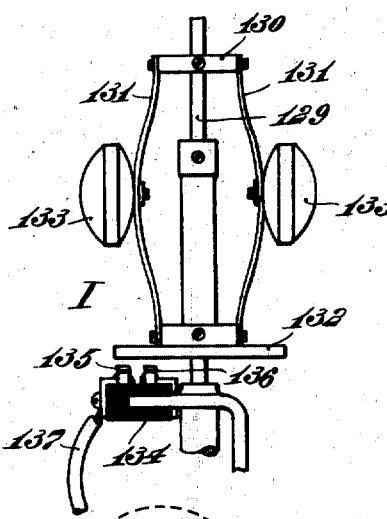
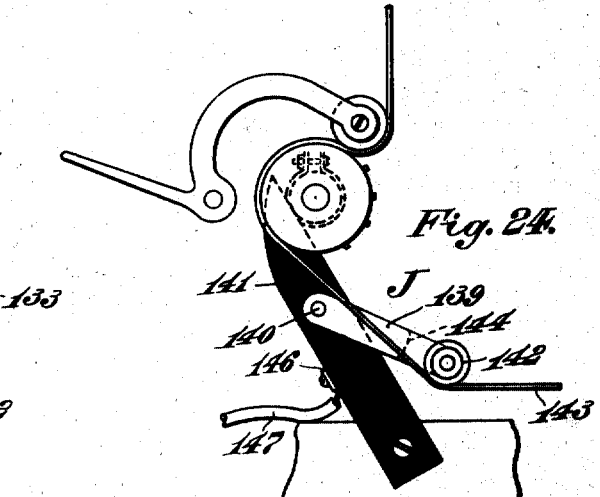
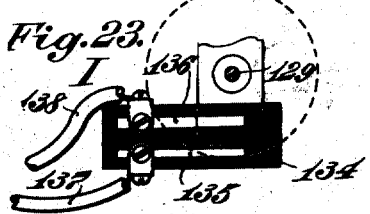
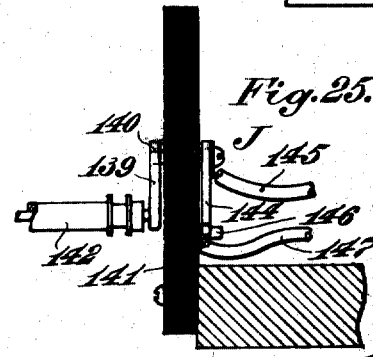

UNITED STATES PATENT OFFICE.

JOHN H. CROSIER, OF PHILADELPHIA, PENNSYLVANIA, ASSIGNOR OF SIX-TENTHS TO GEORGE N. POWELL, OF PITTSBURG, PENNSYLVANIA.

SAFETY APPARATUS FOR AMUSEMENT OR OTHER AUDITORIUMS.

1,000,154.  Specification of Letters Patent.  Patented Aug. 8, 1911.

Application filed March 19, 1909, Serial No. 484,450. Renewed November 18, 1910. Serial No. 593,037.

*To all whom it may concern:*

Be it known that I, JOHN H. CROSIER, a citizen of the United States, residing at the city of Philadelphia, in the county of Philadelphia and State of Pennsylvania, have invented certain new and useful Improvements in Safety Apparatus for Amusement or other Auditoriums, of which the following is a specification.

My invention relates to safety apparatus for use in amusement and other auditoriums, such as theaters, moving picture parlors, or the like; and in such connection it relates particularly to a device for automatically lighting an auditorium and unlocking doors, when abnormal conditions exist, at other points or places. For example, in the particular embodiment of my invention as shown in the drawings, and as hereinafter specifically described, the apparatus is arranged for use in connection with a moving picture projection machine so that when any disarrangement or failure to work properly takes place of such a projection machine, the electric currents employed in connection therewith will instantly be broken, and at the same time, the lights in the auditorium be lit and the locks on the exit doors, released.

The principal object, therefore, of my present invention is to provide a safety appliance for use in amusement or other auditoriums, primarily designed to prevent accidents by automatically or otherwise, "killing" or breaking the electric circuits, which usually are predisposed causes of disastrous fires and at the same time to close other circuits, which primarily are designed to light the amusement or other auditorium and to release locks on exit doors to the end that panics may be averted and the safety of an audience insured, to the greatest possible degree or extent.

The nature, scope and characteristic features of my said invention will be more readily understood from the following description taken in connection with the accompanying drawing forming part hereof showing one specific embodiment of my invention for use in a moving picture projection-machine, in which—

Figure 1, is a diagrammatic view of the apparatus of my invention as arranged, for use in connection with moving picture display parlors, the said view, showing the various circuits and controlling mechanism operating in conjunction therewith. Fig. 2, is a longitudinal sectional view of the main magnet-controlled switch, constituting a principal element of my present invention. Fig. 3, is a top or plan view of the same, partly in section. Fig. 4, is a sectional detail view, partly in elevation, of the releasing mechanism of the switch shown in Figs. 2 and 3. Fig. 5, is a similar view, with the parts thereof shown in operating or releasing position. Fig. 6, is a perspective view of the combined armature and contact make-and-break device, constituting a part of the releasing mechanism of the switch, shown in Figs. 2 and 3. Fig. 7, is an underneath plan view partly in section, of the main switch shown in Fig. 2. Fig. 8, is a fragmentary side elevation of a contact make-and-break device, which is adapted to be controlled by the position of the "lamp house" of the moving picture projection apparatus. Fig. 9, is a view similar to Fig. 8, with a portion of the "lamp house" shown in a position to open or break the contact. Fig. 10, is an end elevation of the device shown in Figs. 8 and 9. Fig. 11, is a fragmentary plan view of a contact make-and-break device adapted to be controlled by the open or closed position respectively, of the "lamp house" door. Fig. 12, is a side elevation of the same. Fig. 13, is an end elevation of the same. Fig. 14, is a sectional plan view of a contact make-and-break device adapted to be controlled by respectively, the opening and closing of the "magazine" door. Fig. 15, is an end elevation of the same. Fig. 16, is a fragmentary elevation of a portion of the projection apparatus with two forms of contact make-and-break devices, shown in connection therewith and adapted respectively, to be operated by the "top loop-guide" and the "gate" of the machine, whereby abnormal positions of either of these devices will serve to close a circuit, as will later appear. Fig. 17, is a side elevation of the device, shown in Fig. 16. Fig. 18, is a top or plan view of a portion of the device shown in Fig. 16. Fig. 19, is a view similar to Fig. 17, with certain portions thereof removed. Fig. 20, is a side elevation of a contact make-and-break device adapted to be controlled by the belt of the moving picture projection apparatus, where the same is driven by any preferred form of electric motor. Fig. 21, is an end elevation of the device shown in Fig. 20. Fig. 22, is an elevation of a device for closing a circuit when the speed of the moving picture projection apparatus, falls below a predetermined limit. Fig. 23, is a fragmentary plan view of a portion of the device shown in Fig. 22. Fig. 24, is a side elevation of a contact make-and-break device, adapted to be used in connection with the " bottom loop-guide " of the projection apparatus; and Fig. 25, is an end elevation of a portion of the structure shown in Fig. 24.

Referring now more particularly to Fig. 1, of the drawings, which, as before stated, is a diagrammatic view of the various circuits and electrically connected parts of the apparatus and auditorium of a moving picture display parlor, 30 and 31, are the main sources of electric supply, from which branches 32 and 33, respectively, run to the pivot end terminal clips 46 and 47, Fig. 7, of the main magnet-controlled switch A. When the moving picture projection apparatus is running, the blades 34 and 35, respectively, contact with clips 36 and 37, from which run the various circuits associated with the operation and control of the projection apparatus. Switch A, is also provided with blades 38 and 39, which are adapted respectively, to contact with clips 40 and 41, from which runs the circuit 42, controlling the auditorium lighting apparatus, and clips 177 and 178, from which runs the circuit 43, controlling the magnet-controlled unit locks B, Fig. 1, on the exit doors of the auditorium.

For the purpose of better understanding the various circuits shown in Fig. 1, attention will first be directed to the construction and operation of the magnet-controlled switch A, which is shown in detail in Figs. 2 to 7, of the drawings. Switch A, and its associated mechanism, is preferably contained within a suitable housing 44, within which is supported an insulating block 45, on and from which the various parts are mounted. The switch proper in many respects resembles the ordinary double pole knife switch commonly used in electric apparatus, the blades 34 and 35, being pivoted respectively, to the usual form of terminal clips 46 and 47, which as before indicated, are connected by wires 32 and 33, to a source of electric supply. The blades 38 and 39, of switch A, are respectively, angular prolongations of the blades 34 and 35. The blades 34 and 35, are normally held in contact with the clips 36 and 37, by means of a latch 48, which engages the magnet-controlled lock C, which will hereinafter be more fully described. Springs 49, normally tend to disengage the blades 34 and 35, from the clips 36 and 37, to thereby disconnect the same from the source of electric supply. When the blades 34 and 35, are disconnected from the clips 36 and 37, then the blades 38 and 39, are in contact with the clips 40 and 41, and 177 and 178, and thus establish electric connection of the auditorium lighting apparatus and the magnet-controlled locks B, on the exit doors, with the source of electric energy.

The magnet-controlled unit lock C, will now be described. The latch 48, projects upwardly from the insulating handle-bar 50, of the switch A, and its upper end is formed into a hook 51, which normally engages a roller 52, carried by a rocking-member 53, which is held in its normal position by means of a spring 54, coiled around a pivot pin 55, of the swinging member 53. Arranged on either side of the swinging member 53, is a dog 56, which is constrained to swing about its pivot 57, by means of pins 58, extending laterally from the sides of the swinging member 53; the said pins loosely engaging in the recesses 59 of the dogs 56. In the normal position of this device, as shown in Fig. 4, the outer or free ends of the dogs 56, rest on the contact plates 60 and 61, carried by an insulating block 62, pivoted at 63, to the containing casing 64, to establish the circuit through the magnets 66 and resistance coil 67, but when the pawls 56, are released from the contact plates 60 and 61, the circuit is broken through the magnets 66, and resistance coil 67. Insulating block 62, carries an armature 65, which is arranged in front of and adapted to be attracted by the poles of the magnets 66. The containing casing 64, also incloses a resistance coil 67, arranged in the same circuit, as the magnets 66, as will hereinafter be more fully described. Arranged in one end of the insulating block 45, is a double pole plug switch 68. The wires running from the resistance coil 67, and around the magnets 66, terminate in screws 69 and 70, which are electrically connected with the sleeves 71 and 72, of the plug switch 68. A bridging-piece 73, extends between the screws 69 and 70, and is carried by the spring 74, the outer end of which is so arranged as to engage the projecting handle of the plug-switch 68, so that when the plug-switch 68, is in position the bridging-piece 73, will be held out of contact with the screws 69 and 70, and when the said plug-switch 68, is removed, the bridging-piece 73, will contact with the said terminal screws 69 and 70, and thereby to establish a short circuit across the same.

The operation of the main switch A, and its associated controlling release-lock C, will now be described. In the normal position of the apparatus, that is to say, when the moving picture machine is operating normally, the current will flow from the mains 30 and 31, through the wires 32 and 33, to the pivot clips 46 and 47, then through the blades 34 and 35, to the clips 36 and 37, and then to the various circuits connected with and controlled by the clips 36 and 37. One of these circuits includes the magnets 66, controlling the operation of the switch A, and will now be traced. Starting from the clip 36, the circuit passes through the wire 75, and then through the magnets 66, which are connected in multiple, by means of wires 76 and 77. The current after passing through the magnets 66, combines and passes through the wire 78, to the contact 60, carried by the pivoted armature carrying insulating block 62, then passes through the dogs 56, and the pivot pin 57, to the contact 61, carried at the other side of the pivoted insulating block 62, then passes through the wire 79, to the resistance coil 67, and terminal screw 70, then through one pole of the switch plug 68, to the line wire 80, then through any one of a series of automatically or manually controlled circuit closing devices, which will be hereinafter more fully described. The current returning to the other line 81, after passing through any one of the aforesaid circuit closing devices, passes through the other pole of the plug-switch 68, to the terminal screw 69, then by the wire 82, to the clip 37, of the main-switch A. When the circuit is established through any of the automatically or manually controlled circuit closing devices, as aforesaid, the magnets 66, will be energized, thereby attracting the armature 65, which is carried by the pivoted insulating block 62, to thus draw this insulating block to one side to release the dogs 56, and consequently, the swinging-member 53, so as to permit the hook 51, of the latch 48, to be disengaged and thus to free the blades 34 and 35, to allow the same to be forced out of engagement with the clips 36 and 37, under the tension of the spring 49, and causing the blades 38 and 39, to engage their respective clips 40 and 41, and 177 and 178. All of the circuits connected with the clips 36 and 37, will thereby be broken, and the circuits connected with the clips 40 and 41, and 177 and 178, will be established.

To relatch the switch A, the handle thereof, is first manually shifted so as to disengage the blades 38 and 39 from the clips 40 and 41 and 177 and 178 which breaks the lighting and door controlling circuits 42 and 43, and at the same time establishes through the blades 34 and 35, contact with the clips 36 and 37, and thereby establishes all the circuits controlled by the said clips 36 and 37. It should be understood that the swinging member 53, is returned to its normal position by means of the spring 54, after the hook 51, has been disengaged therefrom and the dogs 56, are simultaneously returned to their normal positions by means of the pins 58, so that the parts of the magnet controlled lock C, are in proper position, when the switch is relatched. It should be understood of course that the resiliency of the spring latch 48, will permit its hook 51, to pass over the roller 52 and to again engage and be held thereon.

In the diagram shown in Fig. 1, the arc-light 83, of the moving picture projection apparatus is controlled by a circuit established through the wire 84, running from the clip 36, of the main-switch A, through one side of the knife-switch 85, then through the arc 83, then through the wire 86, to the resistance coil 87, which prevents abnormal discharge of the current through the said arc, then passing through the wire 88, and through the other side of the knife-switch 85, and returning through the wire 89, to the other clip 37, of the main-switch A.

Attention will now be directed to the various types of circuit closing devices, which are shown in Fig. 1, in diagram, and in Figs. 8 to 25, in detail, these various circuit closing devices being designed to close the circuit passing through the magnet-controlled lock C, to actuate the same so as thereby to operate the main switch A, when abnormal conditions exist, at various points or places in the projection apparatus.

It is desirable that whenever the "lamp house" door is opened, that all of the circuits connected with the projection apparatus be instantly broken, so that by no possibility can the film be ignited by the arc contained within the "lamp house," when exposed, by the opening of the door, and for this purpose, the contact make-and-break device E, shown in Figs. 11 to 13, of the drawings, is employed. Referring now more particularly to Figs. 11 to 13, of the drawings, the "lamp house" 93, is provided in its interior with an insulating block 94, which is traversed by a headed pin 95, under the tension of a spring 96, which normally tends to cause the head 97, of the pin 95, to contact with the terminal plates 98 and 99, which are connected by the wires 100 and 101 to the lines 80 and 81, of the circuit of the magnet-controlled lock C. The door 102, of the "lamp house," is so arranged that when the same is closed, its fastening-latch 103, will engage the outer end of the pin 95, to thereby maintain the head 97, of the pin 95, away from the plates 98 and 99, so that the circuit is maintained open so long as the door is closed, but the circuit is instantly established, the moment the door is opened, and in this manner "throws" the switch A, as will readily be understood from the hereinbefore described construction and operation of the same and its associated magnet-controlled lock C. The contact make-and-break device E, arranged in connection with the "lamp house" door, is disposed in such position as to bridge the lines 80 and 81, at a point immediately after these lines leave the switch plug 68, hereinbefore described.

The remaining circuit closing devices arranged in conjunction with the projection apparatus, are preferably arranged so as not to close the circuit to cause the switch A, to be actuated, except when the lamp is in position for projecting a picture on the screen. To render these contact make-and-break devices inoperative, a special form of contact make-and-break device F, is employed, the same being shown in Figs. 8, 9 and 10, of the drawings, and adapted to be operated by the "lamp house" bracket 104, when the said "lamp house," is moved sidewise on its slides 105.

The construction of the contact make-and-break device F, is as follows:—Secured to the "lamp house" slide 105, is a downwardly projecting bracket 106, having an insulated extension 107, which carries a bracket 108, in which an insulated pivoted block 109, is mounted, this block carries on its outer end a contact-plate 110, normally held in contact with a plate 111, by means of a spring 112. The circuit is established through the wire 80, running to terminals 113 and 114, passing through the terminal 113, then through the bracket 108, spring 112, plate 110, plate 111, terminal 114, and returning at this point to the line 80. It will thus be seen, that the contact make-and-break device F, is interposed in the line 80, so as to break the circuit passing through the same, whenever the "lamp house," is pushed to one side, in its inoperative position, as shown in Fig. 9, when the bracket 104, thereof, engages with the inner free end of the insulated block 109, thereby serving to raise the plate 110, from contact with the plate 111, as clearly shown in Fig. 9, for the purpose as hereinbefore fully stated.

For the manual control of the operator, a push-button G, or a plurality of the same, may be used to bridge across between the lines 80 and 81, at any preferred point, which is readily accessible to the operator or any other properly, designated person. This push-button may be of any preferred type, and of course it will be readily understood that any other form of manual operated contact make-and-break device may be used, in lieu thereof. It will also be understood, that these push-buttons may be used across the lines 80 and 81, in advance of or beyond the contact make-and-break device F, actuated according to the position of the "lamp house."

Where an electric motor is used to drive the projection machine, it is desirable that some means of controlling the magnet-controlled switch A, be employed and which will be actuated, whenever the belt slips or flies off of the machine, and thereby to "kill" all the lines or circuits connected with the projection apparatus. For this purpose, the device H, shown in Figs. 20 and 21, of the drawings, is employed. Referring now to these figures 115, is the main shaft of the motor, and 116, the pulley thereof, 117, is the driving belt and 118 the driven pulley forming a means for actuating the projection-machine. Pivoted to any preferred portion of the projection machine is a lever-arm 119, weighted at 120, at its outer free end and carrying at its other end an idler-wheel 121, arranged to bear against the underside of the belt 117, the constructive arrangement being such that if the belt 117, becomes disarranged the lever-arm 119, will fall to the position shown in dotted lines in Fig. 20, and the circuit will then be established between the contacts 122 and 123, which are mounted on a suitable insulating block 124, and electrically connected with the lines 80 and 81, by means of the wires 125 and 126.

Should the speed of the projection machine fall below a predetermined limit, the contact make-and-break device I, shown in Figs. 22 and 23, will be employed. This device, consists essentially of a vertical shaft 129, which is rotated at a high rate of speed from any suitable rotating portion of the projection machine. To the upper end of the shaft 129, is fixed a collar 130, having springs 131, secured thereto and which extend downwardly and are secured at their lower ends to a slidable flanged collar 132. Mounted on the springs 131, are weights 133, providing in effect a "governor," which is driven as hereinbefore described, by any suitable rotating part of the projection-machine. Arranged beneath the flanged collar 132, is an insulating block 134, which carries two contact springs 135 and 136, connected by the wires 137 and 138, to the lines 80 and 81, of the magnet-lock circuit, the arrangement being such that when the speed of the projection-machine falls below a predetermined limit, a circuit will be established from the lines 80 and 81, through the wires 137 and 138, contacts 135 and 136, and flanged collar 132, to thereby operate the main switch A.

It sometimes occurs, in the operation of a moving picture projection machine that the film will not be properly fed into the bottom magazine or box, for containing the reel of film after its passage through the machine. This frequently causes tangling of the film, which necessitates stoppage of the machine, and sometimes throws a portion of the film into proximity to the intense heat of the arc, frequently causing fires as a result. To avoid this such a contact make-and-break device, J, as shown in Figs. 24 and 25, is employed, which consists of a lever-arm 139, secured to a pivot-pin 140, passing through a bracket 141, of the "bottom loop guide," and carrying at its outer free end an idler-roller 142, which normally rests on the film 143. The pivot-pin 140, also carries a contact-arm 144, the pivot end of which is electrically connected by the wire 145 to the line 80, and is arranged to contact with a pin 146, connected by the wire 147 to the line 81, the constructive arrangement of which is such as that the contact-arm 144, will be normally held out of contact with the pin 146, by the film, but in the event of an abnormal loop in the film at this point, the contact-arm 144, will fall, and establish a circuit through the pin 146, to thereby operate the main switch A.

To prevent the operator from opening the door of either top or bottom "magazine," that is the boxes containing the film before and after its passage through the projection machine, contact make-and-break devices K and L are employed, one on either "magazine," the same being shown in Figs. 14 and 15, the two being substantially identical, a description of one will suffice. This device is in many respects like the contact make-and-break device E, used in connection with the door of the "lamp house," and consists of an insulating block 150, through which passes a pin 151, which is maintained under the tension of a spring 152, against the door 153, of the "magazine" 154. The pin 151, is provided with a head 155, which is adapted when the door is open to contact with the plates 156 and 157, respectively connected by the wires 158 and 159, to the lines 80 and 81.

In case an abnormal amount of film should be fed from the top "magazine," that is to say, if more be fed than the machine is passing in front of the lens, the film is liable to entangle, and come within the zone of intense heat of the arc, and thereby cause ignition of the same. Also in the event of the operator opening the "gate" of the projection machine it is desirable to be able to cause the magnet controlled switch A, to be operated so as thereby to "kill" the circuits connected with the projection-machine. For this purpose, a composite make-and-break device M, shown in Figs. 16 to 19, is employed, the parts of which are mounted in an insulating block 171. A pin 162 under the tension of a spring 163, has a bent extension 165, which bears against the top of the "gate" of the machine, the arrangement being such, that the top edge of the "gate" or any other suitable portion thereof will hold the pin 162, in its uppermost position when the said "gate" is closed, but when the "gate" is open, the head 164, of the pin 162, will contact with one portion of each of the contact-plates 160 and 161, thereby to establish a circuit between the lines 80 and 81, through the wires 167 and 168, which are connected to the respective plates 160 and 161. The contact plates 160 and 161, extend downwardly and outwardly at one portion thereof, so as to lie in the path of the pivoted bracket 169, of the "top loop guide" of the machine and this arrangement is such that if a bracket 169, be improperly lowered by the operator to allow more film to pass than is being fed by the machine, it will establish a circuit across between the contacts 160 and 161, and thereby actuate the magnet-controlled switch A, to "kill" the circuits connected with the projection-machine.

In the foregoing apparatus there is provided a means for cutting out circuits connected with the operation of the moving picture projection machine at the same time closing circuits to ignite the auditorium lights, and to release the locks on the exit-doors of such auditorium, which apparatus is adapted to be controlled by abnormal conditions existing within the projection machine or to be actuated at will of a proper person.

It will of course be understood, that the foregoing description, is a specific use only of the apparatus when applied to a moving picture projection machine but changes such as will be readily understood by those skilled in the art may be made to suit the defined apparatus of my said invention to many other uses and conditions. For example, the said described invention may be arranged to be used in connection with spot light or other apparatus in theaters, where not necessarily moving picture machines are employed.

The particular constructive arrangement of the magnet-controlled locks B, on the exit-doors has not been specifically described for the reason that these locks are substantially identical in constructive arrangement with the magnet operated lock C, controlling the operation of the main switch A, the only difference being, that the latch 48, as therein shown arranged in connection with the switch A, is attached to the exit-doors, in any suitable manner, not shown. The auditorium light circuit 42, is also adapted to be supplied with electric energy by means of the wires 175 and 176, controlled by the usual form of switch 179.

By reference to Figs. 2, 4, and 5, it will be seen that the spring 49 produces a movement of the hook 51, which acts on the L-shaped swinging member 53 having one arm pivoted at 55 and its other arm projecting so as to engage beneath the hook 51. The hook 51 merely rests of the roller 52 on the end o. the last named arm so as to permit the member 53 to swing freely away from the hook while it is in contact therewith, provided the dog has been released (Fig. 5) so as to permit the member 53 to swing.

Having thus described the nature and characteristic features of my said invention, what I claim as new and desire to secure by Letters Patent is:—

1. In a safety apparatus for auditoriums employing film-picture projection lamps, an electric light for the lamp, a circuit therefor, a source of energy, a switch connecting the source of energy to the said circuit, normally open auditorium translating circuits, a spring tending to open the said switch, contacts associated with the said switch and arranged to close the auditorium circuits when the spring is free to act, a catch to lock the projection lamp circuit closed, an electro-magnet to control the release of the switch from the catch, and means for energizing the magnet on the occurrence of abnormal conditions associated with the projection lamp.

2. In a safety apparatus for auditoriums employing film-picture projection lamps, an electric light for the lamp, a circuit therefor, a source of energy, a switch connecting the source of energy to the said circuit, normally open auditorium translating circuits, a spring tending to open the said switch, contacts associated with the said switch and arranged to close the auditorium circuits when the spring is free to act, a catch to lock the projection lamp circuit closed, an electro-magnet, an armature for the magnet normally locking the catch, a normally open circuit for the electro-magnet, and means associated with the lamp for closing the magnet circuit on the occurrence of abnormal conditions.

3. In an apparatus of the character described, an electric circuit, a translating device in the circuit, a switch to control the circuit, a movable locking mechanism to hold the switch closed, an electro-magnet, an open circuit therefor, an armature for the magnet arranged to normally engage and lock the movable locking mechanism, and means for closing the magnet circuit, and causing the armature to release the lock for the locking mechanism.

4. In an apparatus of the character described, a source of electric energy, two translating devices, a double-throw switch in one position connecting one translating device to the source of energy and in the other position connecting the other translating device to the source of energy, means tending to cause the switch to connect the second translating device to the source of energy, a locking member on the switch, a catch to hold the switch normally so as to connect the first translating device to the source of energy, an electro-magnet having a movable armature independent of the catch for causing the armature to maintain the catch in locking engagement with the switch, a normally open circuit for the magnet, and means for closing the magnet circuit.

5. In an apparatus of the character described, an electric circuit, a translating device in the circuit, a switch having a hook and arranged to control the said circuit, a swinging member having a projection extending beneath the hook, a spring acting on the hook tending to cause it to swing the projection away from the hook, a dog normally locking the swinging member against the action of the spring, an electro-magnet, an armature therefor arranged normally to prevent the dog from releasing the swinging member, a normally open circuit for the magnet, and means for closing the magnet circuit on the occurrence of abnormal conditions in the said circuit.

6. In an apparatus of the character described, an electric circuit, a translating device in the circuit, a switch having a hook and arranged to control the said circuit, an L-shaped swinging member pivoted by one arm and having its remaining arm beneath the hook so as to permit the latter arm to be swung away from and by the hook while in contact therewith, a spring acting on the hook so as to tend to push the said arm away from the hook, a dog to normally prevent the movement of the swinging member, and means for locking and releasing the dog.

7. In an apparatus of the character described, an electric circuit, a switch therein having a latch member, a swinging member having locking engagement with the switch, a dog to hold the swinging member in locking position, an electro-magnet, an armature therefor arranged in one position to cause the dog to hold the swinging member in locking position, and in another position to cause the dog to release the swinging member, and means for closing the circuit of the electro-magnet.

8. In an apparatus of the character described, an electric circuit, a switch therein having a latch member, a swinging member having locking engagement with the switch, a dog to hold the swinging member in locking position, an electro-magnet, an armature therefor arranged in one position to cause the dog to hold the swinging member in locking position, and in another position to cause the dog to release the swinging member, means for closing the circuit of the electro-magnet, and an automatically operated door latch member controlled by the switch.

9. In an apparatus of the character described, an electric circuit, a switch therein having a latch member, a swinging member having locking engagement with the switch, a dog to hold the swinging member in locking position, an electro-magnet, an armature therefor arranged in one position to cause the dog to hold the swinging member in locking position, and in another position to cause the dog to release the swinging member, means for closing the circuit of the electro-magnet, an automatically operated door latch member controlled by the switch, and contacts controlled by the armature and arranged to open the last named circuit when the door latch member is released.

In witness whereof, I have hereunto set my signature in the presence of two subscribing witnesses.

JOHN H. CROSIER.

Witnesses:
J. WALTER DOUGLASS,
THOMAS M. SMITH.